June 24, 1952 — E. L. ZIENTOWSKI — 2,601,582
FISHING REEL
Filed March 4, 1950
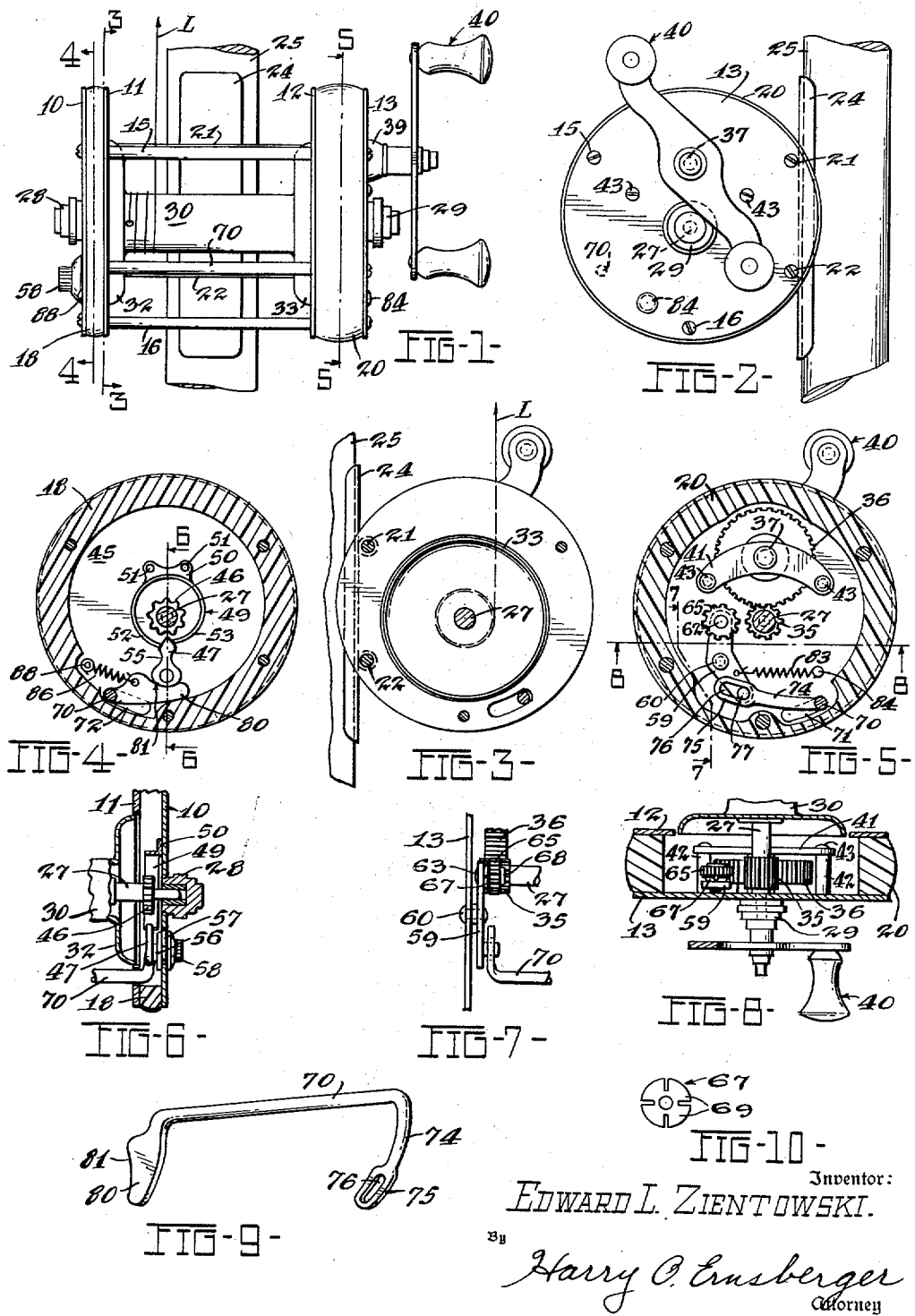
Inventor:
EDWARD L. ZIENTOWSKI.
By Harry O. Ernsberger
Attorney Patented June 24, 1952

2,601,582

UNITED STATES PATENT OFFICE 2,601,582

FISHING REEL

Edward L. Zientowski, Toledo, Ohio

Application March 4, 1950, Serial No. 147,660

3 Claims. (Cl. 242—84.6)

This invention relates to fishing reels and more especially to an arrangement for eliminating or minimizing the over-running of a reel during casting operations and thus eliminate tendency for the fishing line to blacklash i. e. the haphazard snarling of the fishing line on the reel drum through successive rotative movements of the drum in opposite directions.

It is well known by most anglers that when there is a lack of synchronization between the movement of a fish lure in flight and the "playing out" or unwinding of the line from a rotating drum during a lure casting operation a backlash or snarled condition of the line usually results therefrom. The present invention has for an object the provision of means embodied in a fishing reel and under manual control of the user for instantly retarding the speed of a rotating drum so as to prevent the snarling or backlash of a fishing line.

Another object of the invention is the provision of a fishing reel embodying a means for manually bringing into action a friction means engageable with the drum assembly for retarding the rotative movement of the drum.

Another object of the invention is the provision of means incorporated in a fishing reel including a frictionally supported gear arranged to be manually moved into engagement with a gear on the drum assembly in order to retard rotative movement of the drum, the frictionally supported gear being normally resiliently biased to an ineffective position.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a top plan view of a fishing reel embodying a form of my invention;

Figure 2 is a side view of the reel illustrated in Figure 1;

Figure 3 is a sectional view taken substantially one the line 3—3 of Figure 1;

Figure 4 is a sectional view taken substantially on the line 4—4 of Figure 1;

Figure 5 is a sectional view taken substantially on the line 5—5 of Figure 1;

Figure 6 is a sectional view taken substantially on the line 6—6 of Figure 4;

Figure 7 is a fragmentary sectional view taken substantially on the line 7—7 of Figure 5;

Figure 8 is a sectional view taken substantially on the line 8—8 of Figure 5;

Figure 9 is an isometric view of a manipulating member forming a part of the invention, and Figure 10 is a plan view of a resilient plate forming an element of the invention.

Referring to the drawings in detail the fishing reel construction embodies a frame which is inclusive of pairs of spaced metal plates 10 and 11, 12 and 13, which are joined together by stays or shafts 15 and 16. Arranged between the pair of plates 10 and 11 is an annularly shaped member 18 preferably formed of rigid plastic which with the plates 10 and 11 forms a housing enclosing certain mechanism hereinafter described. The plates 12 and 13 are spaced apart by means of an annular member 20 which forms a housing enclosing the actuating gear arrangement for the drum. The plates 10, 11, 12 and 13 are also joined together by means of shafts 21 and 22 to which is secured an elongated plate 24 curved in a transverse direction to fit upon the butt or grip portion 25 of a fishing rod by means of suitable annular clamping devices (not shown). A shaft 27 projects through the plates 10, 11, 12 and 13 and is journaled at its ends in suitable bearings contained within bearing cages 28 and 29. Supported upon and adapted to rotate with the shaft 27 is a spool or drum 30 having end flanges 32 and 33 respectively disposed adjacent the innermost plates 11 and 12. The drum 30 provides a means for carrying a supply of fishing line.

Secured on the shaft 27 is a gear 35 adapted to be in constant mesh with a gear 36 the latter being secured to a stub shaft 37 suitably journaled on a bearing enclosed within a boss 39 formed on or supported by the plate 13. Fixedly secured to the shaft 37 exteriorly of the housing formed by plates 12 and 13 is a manual means in the form of a double ended crank 40 for manually actuating or rotating the drum or spool 30 in either direction of rotation. The stub shaft 37 is journaled on a crescent shaped member 41, the latter being secured to the plate 13 by means of cylindrical members 42, the ends of which are swaged as at 43. The line receiving drum 30 is driven through the medium of gears 35 and 36, the gear 36 being of larger diameter than the gear 35 whereby the drum will be rotated at a much higher speed than rotation of the crank assembly or manually operated means 40.

The annulus 18 disposed between the frame plates 10 and 11 provides a chamber or enclosure 45 through which extends the drum supporting shaft 27. Mounted on the shaft 27 and adapted to rotate therewith is a toothed member or gear 46 hereinafter referred to as a click wheel, which is adapted under certain conditions to be engaged by a resiliently biased pawl or detent 47. Engagement of the pawl 47 with the click wheel 46 impresses a drag upon the drum 30 so as to prevent free or unrestricted rotation thereof. A spring member 49 of annular configuration is formed with an integral ledge 50 secured to the plate 10 by means of rivets 51. The curved leg portions 52 and 53 of the spring terminate adjacent the pawl 47, the extremities of the spring or leg portions being out of alignment and engaging the detent 47. The detent 47 is secured upon a stub shaft 56 to which is secured a manipulating button or knob 58, the shaft 56 being slidable in a direction to engage and disengage the pawl 47 with the click wheel 46, the shaft 56 passing through an elongated slot 57 formed in the frame plate 10 as shown in Figure 6. The knob 58 and detent 47 when moved upwardly as viewed in Figures 1 and 6, bring the apex portion of the detent 47 into the path of the teeth on the click wheel 46. Thus the detent may be brought into operative and nonoperative position by means of slidable manipulation of the knob 58. When the knob 58 is moved to a position to engage the detent with the click wheel 46, and the drum 30 rotated by manual operation of the crank assembly 40 in a direction to "play out" or unwind the line from the drum, the spring leg 52 engages in a recess 55 in the detent to resiliently retain the latter in operative engagement with the click wheel 46. When the detent 47 is in engagement with the click wheel 46 and the drum is rotated in the opposite direction to wind the fishing line upon the drum, the spring leg 53 is in a position of engagement with the canted side wall of the detent 47 so as to bias the detent out of engagement with the click wheel 46. In this manner the drag on the drum imposed through the engagement of the detent 47 with the click wheel or toothed member 46 is automatically rendered ineffective when the line is wound inward upon the drum. This arrangement is disclosed in my copending application, Serial No. 83,275.

When the lure during a casting operation does not carry through the air so as to continuously maintain the line taut as the drum or spool containing the line is unwound, the drum overruns, then successively alternates its rotation by reason of the slack line, resulting in snarling the line on the drum in a haphazard manner conventionally termed a "backlash." The present invention is inclusive of a manually controlled means for impressing a friction brake or means resisting rotation of the drum so as to prevent overrunning of the drum in a manner to eliminate backlash. The means for accomplishing this purpose includes a member or bellcrank 59 which is pivotally supported for oscillation upon a stub shaft or rivet 60 supported upon the frame plate 13. One end of the member or bellcrank 59 supports a stub shaft 62 which is swaged as at 63 to be rigidly secured to the member 59. Journaled upon the shaft 63 is an element 65 the periphery of which is of undulated, serrated or gear like character for enmeshment or engagement with a member mounted on the drum supporting shaft 27. In the present embodiment the member on the shaft 27 with which the element 65 is adapted for engagement is the driven gear 35 which is actuated by gear 36 through the crank or manipulating means 40 for rotating the drum. It is to be understood that the element 65 may be arranged to engage a separate member mounted on the shaft 27 if desired. Interposed between the gear or toothed member 65 and the arm 59 is a cup shaped member or flexible plate 67 which is configurated in a manner to exert or impress a friction component on the element or gear 65 resisting rotation of the latter through friction means. The cup-like member 67 may be formed with resilient segments 69 as shown in Figure 10 which are flexed in assembly to exert pressure against the element 65 to introduce friction for resisting rotation thereof. It is to be understood, however, that any suitable means adapted to impress a frictional component resisting rotation of the toothed member or element 65 may be utilized for the purpose. The end of the shaft 62 adjacent the element 65 is provided with a head or shoulder 68 forming an abutment means to prevent the member 65 from being dislodged on the shaft 62.

As illustrated in Figures 5 and 8, the element 65 and member 59 are arranged so that pivotal movement of the member about the axis of the rivet or stub shaft 60 causes enmeshment or demeshment of elements or gears 35 and 65. It will be apparent that when the element 65 is in engagement with the gear 35 or other member secured to the shaft 27, that the frictional component set up by the flexible member 67 resisting rotation of the toothed element 65 also retards rotation of the gear 35, shaft 27 and drum 30.

The manually operated means for shifting the position of the member 59 and the toothed element or gear 65 includes a bar or rod 70 which extends parallel to and coextensive with the drum 30. The plates 12 and 13 of the reel frame are respectively provided with slots 71 and 72, as shown in Figures 4 and 5, to accommodate the bar 70, portions of which extend into the chambers or enclosures formed by the pairs of frame plates. A portion 74 of the bar 70 extending into the chamber formed by the annulus 20 is configurated to extend in a direction parallel to the frame plates. Portion 74 of the bar 70 is enlarged at its extremity as at 75 and is formed with a slot or opening 76 into which extends a pin 77 carried by an end portion of the bell crank or member 59. The other end portion of the bar 70 extending into the chamber 45 formed by the annulus 18 is provided with a portion 80 which is configurated to provide a cam surface 81. The cam surface 81 is configurated so that upon relative movement of the bar 70 from its normal position, as shown in Figures 4 and 5, the cam portion 81 exerts inwardly directed pressure against the detent 47 to move the latter into engagement with the toothed member or click wheel 46 to render the drag effective in the manner hereinbefore explained.

The bellcrank or member 59 is normally biased in a direction to disengage the toothed element 65 from the gear 35 by means of a contractile coil spring 83 one end of which is connected to the bellcrank 59, the other end being anchored to a pin 84 carried by the frame plate 13 as shown in Figure 5. The cam member 80 and the adjacent end of the bar 70 are biased in a direction disengaging the cam surface 81 from the detent 47. The biasing means employed in the embodiment illustrated is a contractile coil spring 86, one end of which is connected to the member 80, while the other end is anchored to a pin 88 extending between the plates 10 and 11. Thus by means of the contractile springs 83 and 86 an effective resilient means is provided biasing the bar 70 to its normal position as indicated in Figures 4 and 5 with the portion 80 out of camming engagement with the detent 47 and the member 59 in a position disengaging the toothed element 65 from the gear 35. Figure 9 illustrates an isometric view of the bar 70 forming the manipulating means for shifting the position of the gear 65 and the cam 81. The slots 71 and 72 formed in the plates 11 and 12 respectively are of a size to admit the large end 75 and portion 74 of the bar so as to facilitate assembly of the bar 70 in the reel structure.

The operation of the reel of my invention is as follows: When a user of the device performs a lure casting operation i. e., launching a lure attached to the fishing line L through the air and into the water, the line L is played or unwound from the drum or spool 30. During the unwinding of the line L the toothed member 65 is out of engagement with the gear 35 and the detent 47 is out of engagement with the toothed member or click wheel 46, thus facilitating free and unrestrained rotation of the drum 30, gears 35, 36 and the crank structure 40. In the event that the line L becomes slack by reason of improper flight of the lure, the drum 30 may overrun its normal speed and if not restrained would cause instant tangling or snarling of the line on the drum through repeated partial rotations of the drum in alternate directions in quick succession. The user of the device immediately senses a slackness in the line and by simply exerting pressure by means of the thumb on the bar 70 in a counterclockwise direction as viewed in Figure 5 moves the bar 70 causing an end wall of the slot 76 to engage pin 77 oscillating the bellcrank or member 59 about its pivotal support 60 to engage or enmesh the toothed element 65 with the teeth of gear 35 or other suitable member secured to the shaft 27 of the drum assembly. Due to the presence of the frictional resistance of the toothed element 65 set up by reason of its continuous contact with the spring plate or disc 67 the frictional retarding component acting on the element 65 restrains rotation of the gear 35 and hence the drum 30, reducing the speed of the latter to immediately prevent overrunning of the drum and elminating liability of a backlash condition of the line. Concomitantly with the movement of the bar 70 toward the position to engage element 65 with gear 35 the portion 80 is also moved in a direction to engage the cam surface 81 with the detent 47 to move the latter into the locus of the teeth of click wheel 46 to also render the drag effective on the drum. Immediately upon releasing pressure on the bar 70 the springs 83 and 86 move the bar 70 to its initial or normal position illustrated in Figures 4 and 5. This movement immediately results in shifting of the position of the bellcrank or member 59 to disengage the toothed element 65 from the gear 35. Simultaneously the portion 80 is biased away from the detent 47 so that the latter is in a position to be automatically moved out of enmeshment with the teeth of click wheel 46 under the influence of the spring leg 53 upon manual operation of the drum by the operating means 40 in a direction to wind the line L onto the drum.

From the foregoing it will be seen that the present construction provides a simple yet effective means of instantly retarding the rotation of the drum 30 by manual means under control of the user at all times. It should be noted that the longitudinal portion of the bar 70 extending parallel with the axis of the drum 30 is conveniently disposed so that the thumb of the user may rest lightly upon the bar during casting operations so that the latter may be depressed instantly if desired. It is to be further understood that any suitable manually operated friction means may be employed to resist rotation of the drum 30. Furthermore, other forms of element 65 may be employed such as an element having a serrated or knurled surface adapted for engagement with a correspondingly serrated or knurled surface on a member mounted on shaft 27 or cooperating braking surfaces formed on both elements would also function to satisfactorily retard rotation of the drum 30. It will be further apparent that the detent 47 may be moved into and out of engagement with the click wheel 46 by slidable manipulation of the button 58 independently of movement of the bar 70.

It is apparent that, within the scope of the invention, modifications and different arrangements may be made other than is herein disclosed, and the present disclosure is illustrative merely, the invention comprehending all variations thereof.

I claim:

1. In a fishing reel, in combination, a frame, a line receiving drum journaled for rotation on said frame, means for rotating the drum including a gear member connected to said drum; a centrally pivoted bellcrank, a frictionally braked gear mounted at one end of said bellcrank, for movement into engagement with said first mentioned gear, resilient means for normally biasing said frictionally braked gear out of engagement with said first mentioned gear, a click wheel connected to said drum, a pawl for engaging said click wheel, means for normally disengaging said pawl from said click wheel, and a thumb control bar, one end of which is connected to the other end of said bellcrank and the other end of which abuts said pawl, said thumb control bar being movably mounted to engage said braked gear and said pawl simultaneously.

2. In a fishing reel, in combination, a frame, a line receiving drum journaled for rotation on said frame, means for rotating the drum including a gear member connected to one side of said drum; a centrally pivoted bellcrank, a frictionally braked gear mounted at one end of said bellcrank for movement into engagement with said first mentioned gear, resilient means for normally biasing said frictionally braked gear out of engagement with said first mentioned gear, a click wheel connected to the other side of said drum; a pawl for engaging said click wheel, means for normally disengaging said pawl from said click wheel, and a thumb control bar, one end of which is connected to the other end of said bellcrank and the other end of which abuts said pawl, said thumb control bar being movably mounted to engage said braked gear and said pawl simultaneously.

3. In a fishing reel, in combination, a frame, a line receiving drum journaled for rotation on said frame, means for rotating the drum including a gear member connected to one side of said drum; a centrally pivoted bellcrank, a frictionally braked gear mounted at one end of said bellcrank for movement into engagement with said first mentioned gear, resilient means for normally biasing said frictionally braked gear out of engagement with said first mentioned gear, a click wheel connected to the other side of said drum; a pawl for engaging said click wheel, means for normally disengaging said pawl from said click wheel, slots in said frame, and a thumb control bar, one end of which is connected to the other end of said bellcrank and the other end of which abuts said pawl, said thumb control bar being movably mounted in said slots to engage said braked gear and said pawl simultaneously.

EDWARD L. ZIENTOWSKI.

REFERENCES CITED

The following references are of record in the file of this patent:

UNITED STATES PATENTS

| Number | Name | Date |
|---|---|---|
| 659,477 | Holzmann | Oct. 9, 1900 |
| 730,457 | Howe | June 9, 1903 |
| 850,580 | Holzmann | Apr. 16, 1907 |
| 969,234 | Wollensak | Sept. 6, 1910 |
| 1,417,633 | Schmid | May 30, 1922 |
| 2,303,645 | Lacy | Dec. 1, 1942 |